US012578528B2

(12) United States Patent
Jain et al.

(10) Patent No.: US 12,578,528 B2
(45) Date of Patent: Mar. 17, 2026

(54) UNIDIRECTIONAL, ASYMMETRIC, E-SKID, WAVEGUIDE GRATING ANTENNA

(71) Applicant: Luminar Technologies, Inc., Orlando, FL (US)

(72) Inventors: Aditya Jain, Minneapolis, MN (US); Li-Yuan Chiang, San Diego, CA (US)

(73) Assignee: Luminar Technologies, Inc., Orlando, FL (US)

( * ) Notice: Subject to any disclaimer, the term of this patent is extended or adjusted under 35 U.S.C. 154(b) by 135 days.

(21) Appl. No.: 18/356,968

(22) Filed: Jul. 21, 2023

(65) Prior Publication Data
US 2023/0358954 A1 Nov. 9, 2023

Related U.S. Application Data

(63) Continuation of application No. 17/677,790, filed on Feb. 22, 2022, now Pat. No. 11,709,318.

(51) Int. Cl.
G02B 6/12 (2006.01)
(52) U.S. Cl.
CPC .................... G02B 6/12011 (2013.01); G02B 2006/12061 (2013.01)
(58) Field of Classification Search
CPC .................. G02B 6/12011; G02B 2006/12061
USPC .......................................................... 385/37
See application file for complete search history.

(56) References Cited

U.S. PATENT DOCUMENTS

| | | | |
|---|---|---|---|
| 2003/0059190 A1* | 3/2003 | Gunn, III | G02B 6/132 |
| | | | 385/130 |
| 2015/0049998 A1 | 2/2015 | Dumais | |
| 2017/0315420 A1* | 11/2017 | Watts | G02F 1/225 |
| 2020/0225558 A1 | 7/2020 | Lipson et al. | |

(Continued)

FOREIGN PATENT DOCUMENTS

| | | |
|---|---|---|
| WO | 2019005823 A1 | 1/2019 |
| WO | 2021168465 A1 | 8/2021 |

OTHER PUBLICATIONS

Jahani, Saman , et al., "Controlling evanescent waves using silicon photonic all-dielectric metamaterials for dense integration", Nature Communications, vol. 9, No. 1893, May 14, 2018, p. 1-9.

(Continued)

*Primary Examiner* — Jerry M Blevins
(74) *Attorney, Agent, or Firm* — Van Pelt, Yi & James LLP

(57) ABSTRACT
A waveguide grating antenna apparatus includes a substrate layer, a lower waveguide array layer upon the substrate, and an upper waveguide array layer positioned above the lower waveguide array layer. The lower waveguide array layer is composed of a plurality of first waveguides extending axially and a plurality of second waveguides extending axially and arranged in parallel and alternating in position with the plurality of first waveguides across the lower waveguide array layer. Each first waveguide is of a first maximum width. Each second waveguide is of a second maximum width narrower than the first maximum width and is spaced apart from each adjacent first waveguide. The upper waveguide array layer is composed of adjacent, separated elements extending axially along each first waveguide and each second waveguide.

19 Claims, 9 Drawing Sheets

(56) References Cited

U.S. PATENT DOCUMENTS

2022/0334417 A1* 10/2022 Anderson ............... G02F 1/025

OTHER PUBLICATIONS

Phare, Christopher T., et al., "Silicon Optical Phased Array with High-Efficiency Beam Formation over 180 Degree Field of View", arXiv: Applied Physics, Feb. 13, 2018.
Raval, Manan , et al., "Unidirectional waveguide grating antennas with uniform emission for optical phased arrays", Optics Letters, vol. 42, No. 13, Jul. 1, 2017, p. 2563-66.
Wang, Liping , et al., "Design of a low-crosstalk half-wavelength pitch nano-structured silicon waveguide array", Optics Letters, vol. 44, No. 13, Jul. 1, 2019, p. 3266-69.

* cited by examiner

UNIDIRECTIONAL, ASYMMETRIC, E-SKID, WAVEGUIDE GRATING ANTENNA

CROSS-REFERENCE TO RELATED APPLICATIONS

This application is a continuation of U.S. patent application Ser. No. 17/677,790 filed 22 Feb. 2022 entitled "Unidirectional, asymmetric, e-skid, waveguide grating antenna," which is hereby incorporated herein by reference in its entirety.

BACKGROUND

Waveguide grating antenna (WGA) arrays are used in light-detection-and-ranging (LiDAR) devices to generate focused and directed light output. It is desirable to limit optical crosstalk effects between antennas in the array to increase focus and intensity of light output.

The information included in this Background section of the specification, including any references cited herein and any description or discussion thereof, is included for technical reference purposes only and is not to be regarded subject matter by which the scope of the invention as defined in the claims is to be bound.

SUMMARY

The disclosed WGA array for use in LiDAR device combines the concepts of asymmetric ridge waveguides, extreme skin-depth (e-skid) waveguides, and Si/SiN dual-layer unidirectional WGA design. An example implementation of a WGA array as further described herein is formed of two waveguide layers arranged vertically with respect to each other. A lower waveguide layer includes an array of alternating, asymmetric waveguides formed of silicon (Si). The two waveguide forms may include a discrete ridge waveguide and an e-skid-type waveguide, with a wider center ridge and two laterally adjacent narrow ridges separated from each side of the center ridge by air gaps. A larger-width channel may separate adjacent ridge waveguides and the narrow ridges of the e-skid waveguides. Each of the discrete ridge waveguide and the e-skid waveguide may be formed of sections of alternating widths extending longitudinally. In an example implementation, the center-to-center pitch of the discrete ridge waveguide to the e-skid waveguide is less than 1.1 μm and may be 1.0 μm. In an alternate explanation, the narrow ridges may be understood as being asymmetrically arranged with respect to the center ridge and the discrete ridge resulting in two types of e-skid waveguides extending side-by-side, each sharing the narrow ridges on lateral sides with different separation distances between the narrow ridges and the center ridge, i.e., a narrow gap, and the discrete ridge, i.e., a wide gap.

An upper waveguide layer includes an array of silicon nitride (SiN) gratings formed on top of each of the two lower waveguide forms. In an example implementation, the widths of the SiN gratings above and along the e-skid waveguides may be wider than the widths of the SiN gratings above and along the discrete ridge waveguide. In an example implementation, the widths of the SiN gratings above and along the discrete ridge waveguide may be wider than the width of the discrete ridge waveguide. In an example implementation, the widths of the SiN gratings above and along the e-skid waveguide may be narrower than the width of the e-skid waveguide when the lateral narrow ridges are included in the measurement of width.

The asymmetry between the two waveguide forms in the lower waveguide layer may provide improved suppression in optical crosstalk while potentially reducing or eliminating the fabrication constraint in minimum feature size as in the case of symmetric e-skid waveguides. The e-skid structures provide an additional degree of freedom in the geometric parameters to alter for tuning. The widths and heights of, and the separation distances between, the discrete ridge waveguides and the e-skid waveguides may be similar to favor balanced emission properties of the two kinds of WGAs. The SiN gratings may induce a constructive interference for unidirectional upward emissions. The WGA array design disclosed herein features a wide horizontal FoV of up to approximately 100°, small beam divergence ($\delta\theta$) ~0.045°, and low light intensity loss of approximately 0.4 dB at 1550 nm from simulation results.

In an example implementation, A waveguide grating antenna apparatus includes a substrate layer, a lower waveguide array layer upon the substrate, and an upper waveguide array layer positioned above the lower waveguide array layer. The lower waveguide array layer is composed of a plurality of first waveguides extending axially and a plurality of second waveguides extending axially and arranged in parallel and alternating in position with the plurality of first waveguides across the lower waveguide array layer. Each first waveguide is of a first maximum width. Each second waveguide is of a second maximum width narrower than the first maximum width and is spaced apart from each adjacent first waveguide. The upper waveguide array layer is composed of adjacent, separated elements extending axially along each first waveguide and each second waveguide.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The disclosure will be readily understood by the following detailed description in conjunction with the accompanying drawings, wherein like reference numerals designate like structural elements.

The use of cross-hatching or shading in the accompanying figures is generally provided to clarify the boundaries between adjacent elements, e.g., when shown in cross section, and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Figure 1:
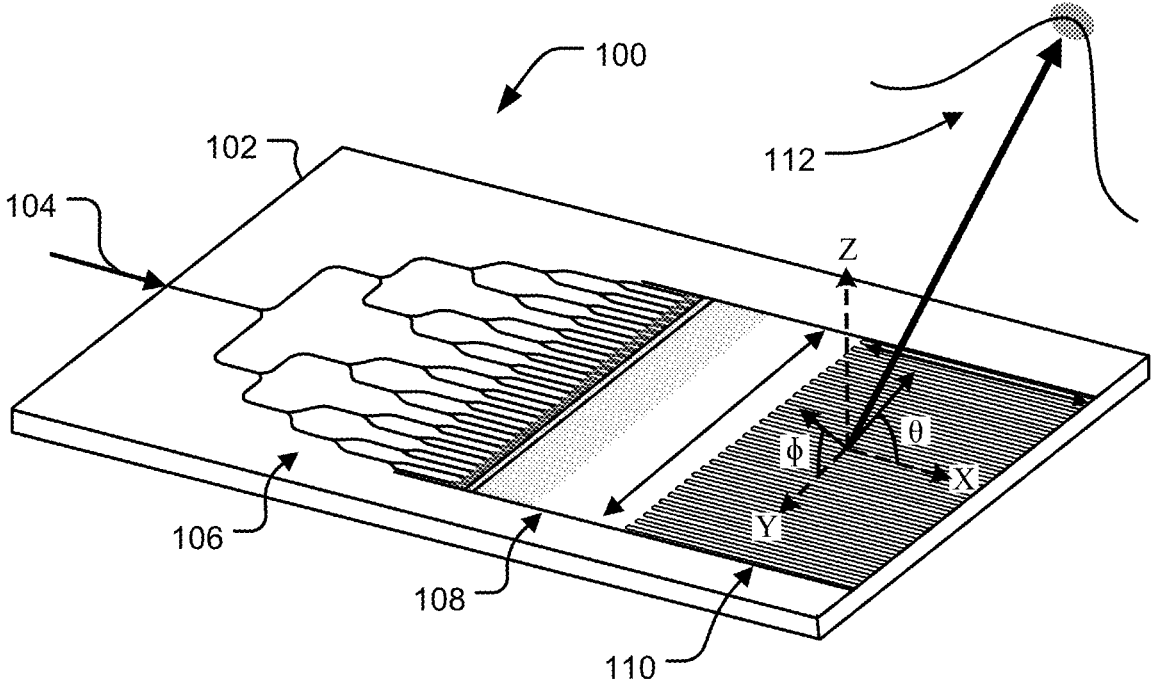

FIG. 1 is a schematic diagram of an example of a unidirectional, upward-emitting, solid-state, optical phased array LiDAR chip with a waveguide grating antenna array.

Figure 2:
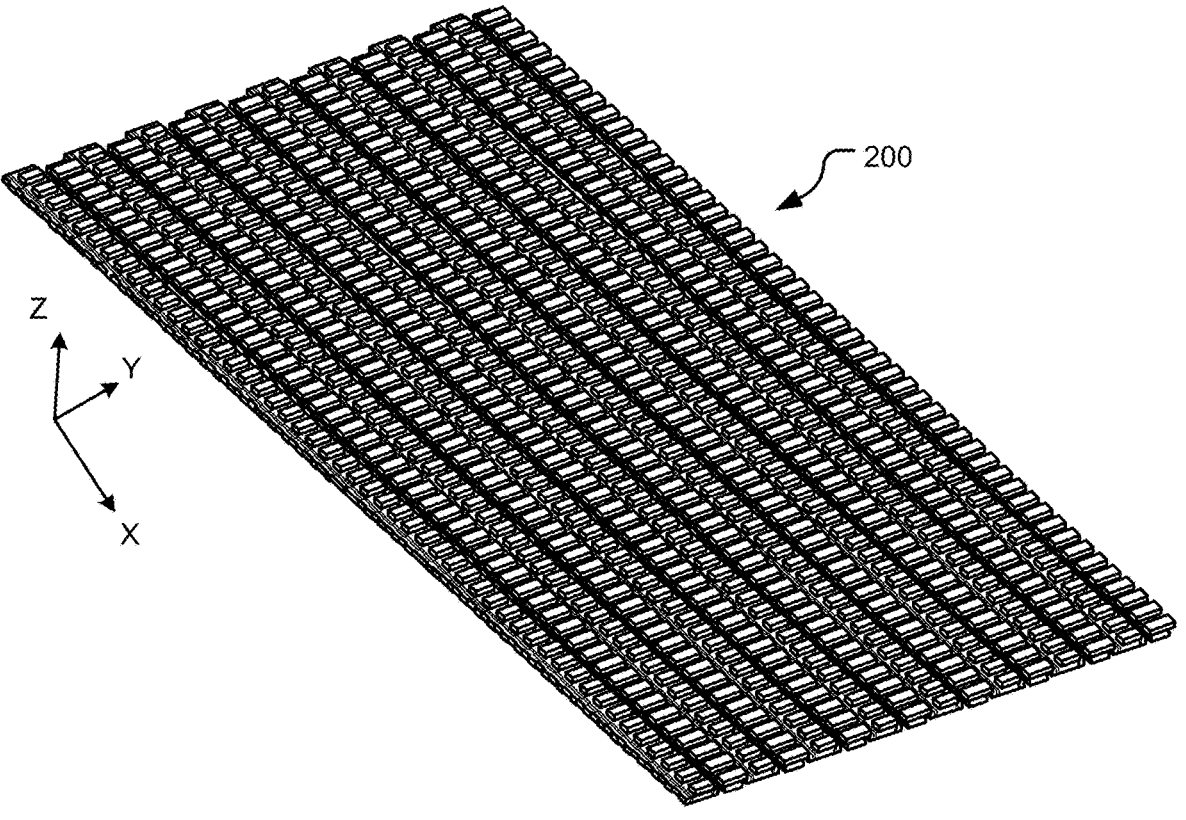

FIG. 2 is a top, front, left isometric view of a section of a waveguide grating antenna array for incorporation into a solid-state, optical phased array LiDAR chip according to an example implementation disclosed herein.

Figure 3:
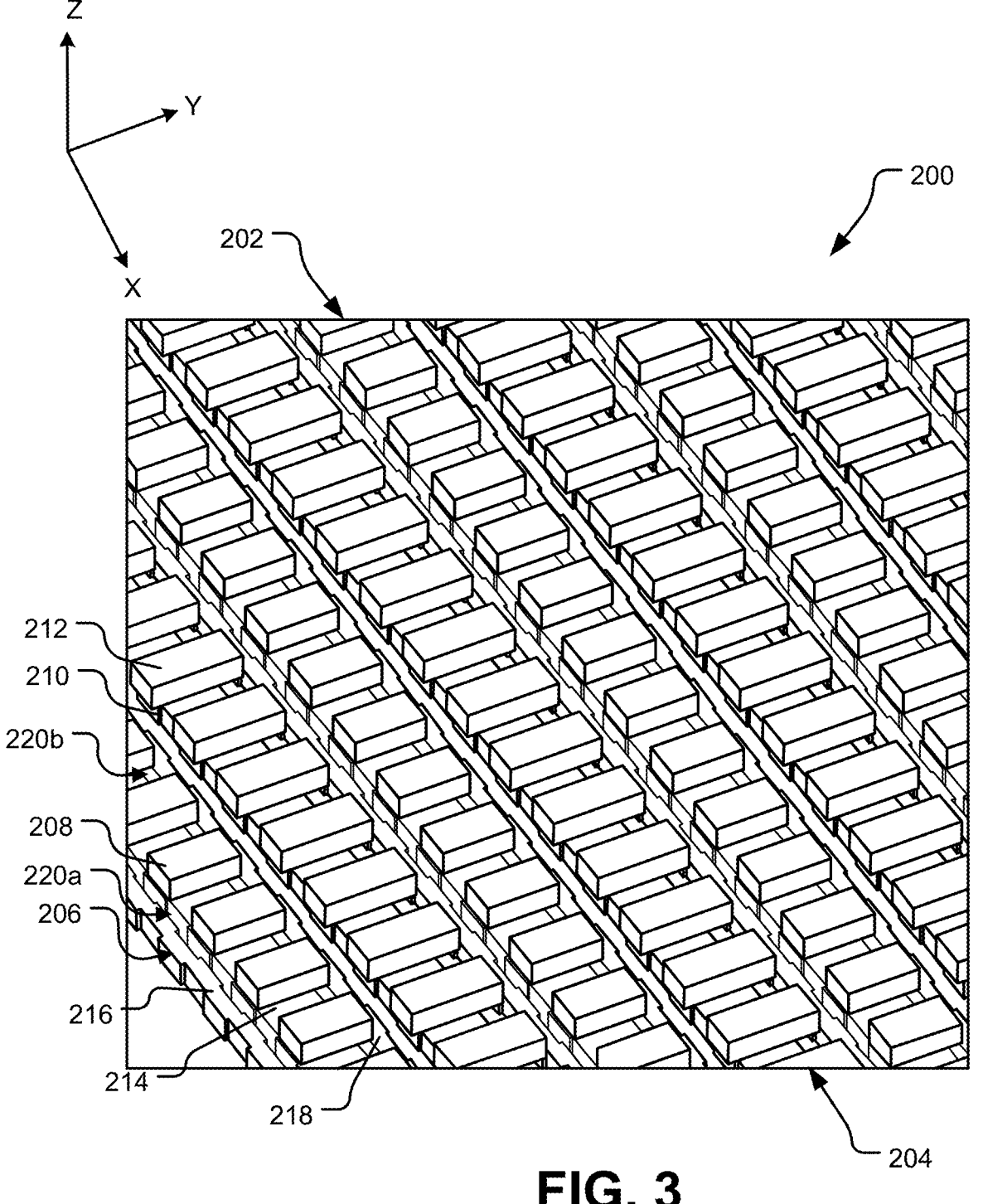

FIG. 3 is an enlarged view of a portion of the waveguide grating antenna array of FIG. 2.

Figure 4:
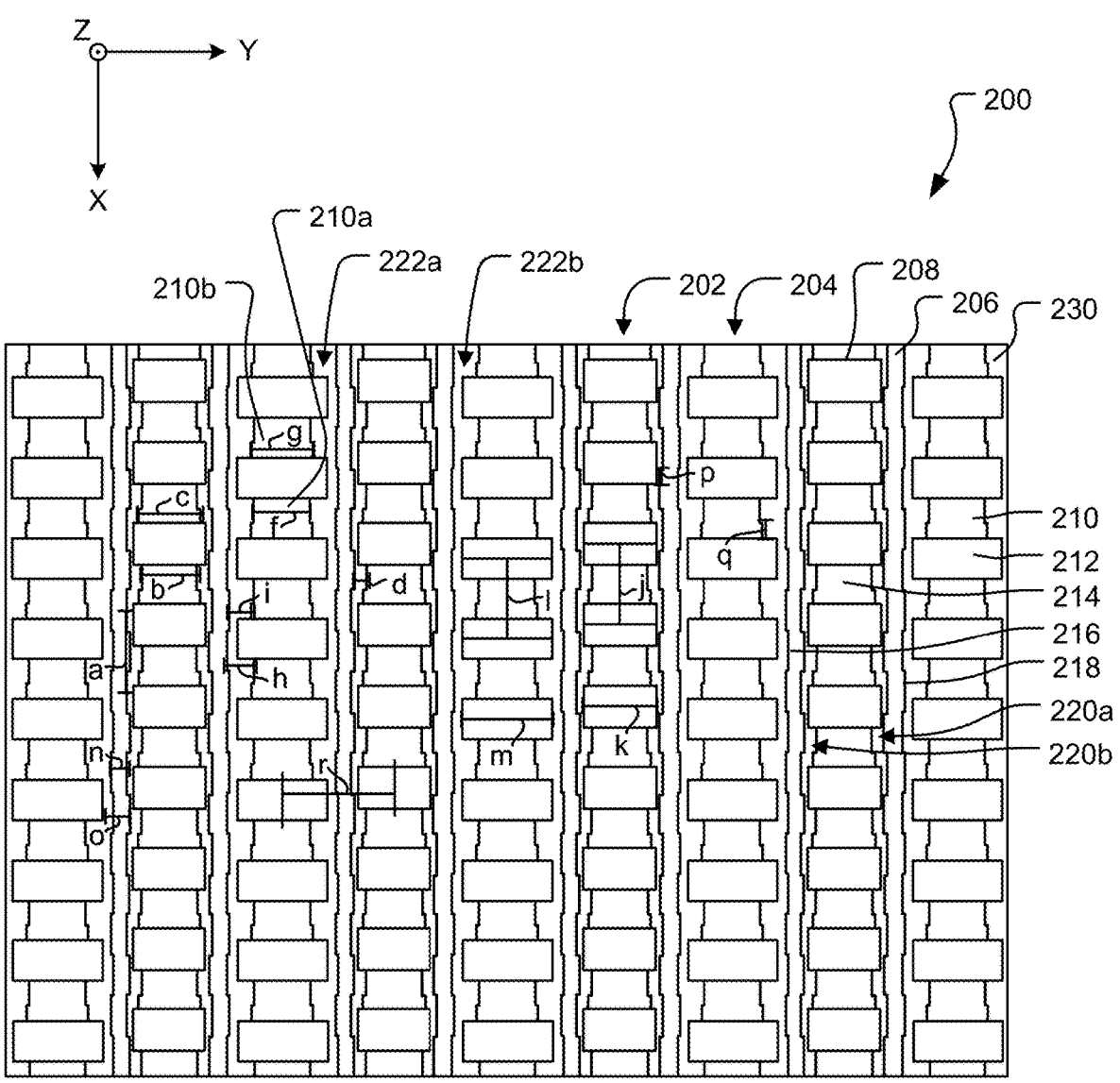

FIG. 4 is an enlarged top plan view of a portion of the waveguide grating antenna array of FIG. 2.

Figure 5:
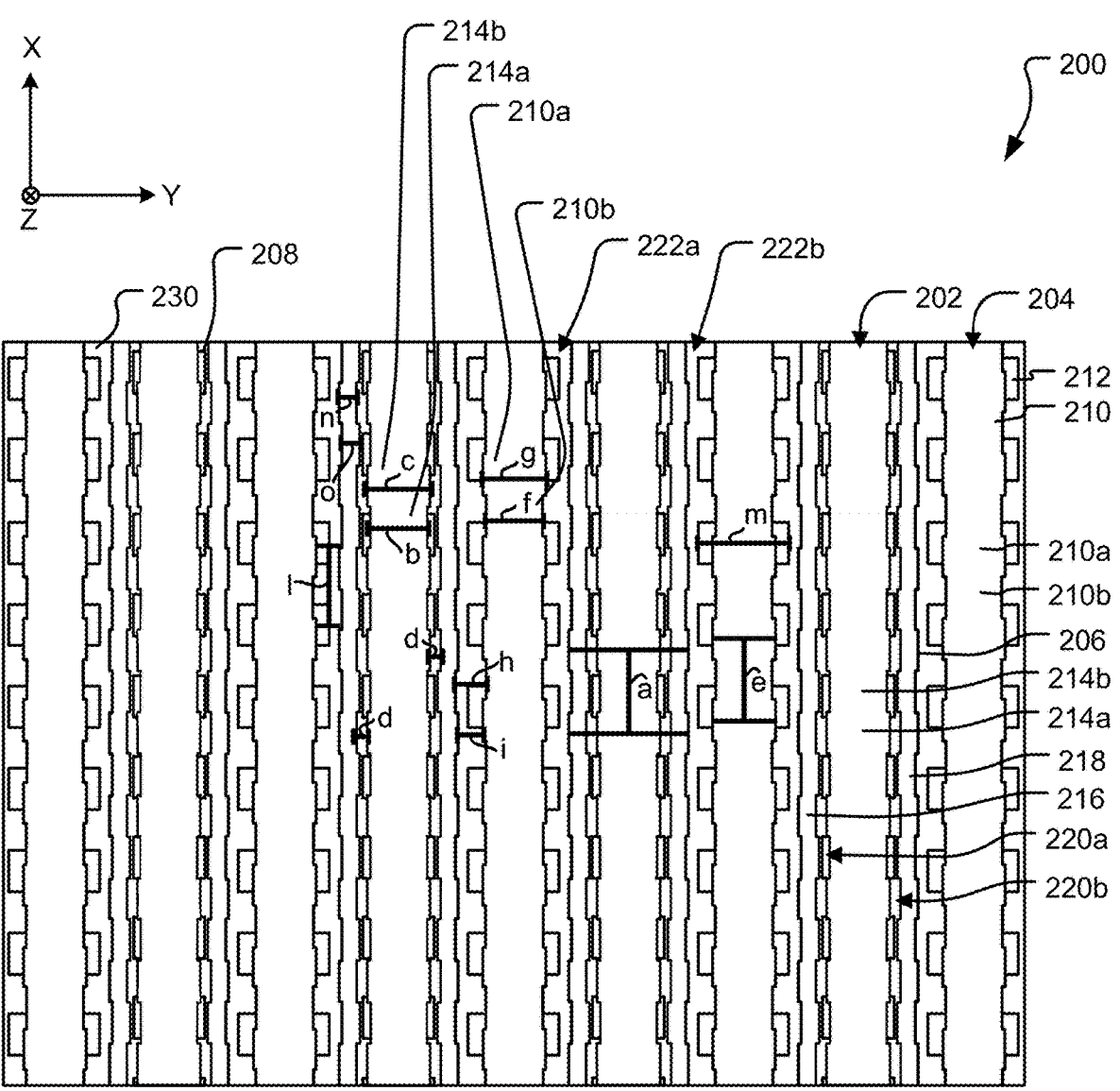

FIG. 5 is an enlarged top plan view of a portion of the waveguide grating antenna array of FIG. 2.

Figure 6:
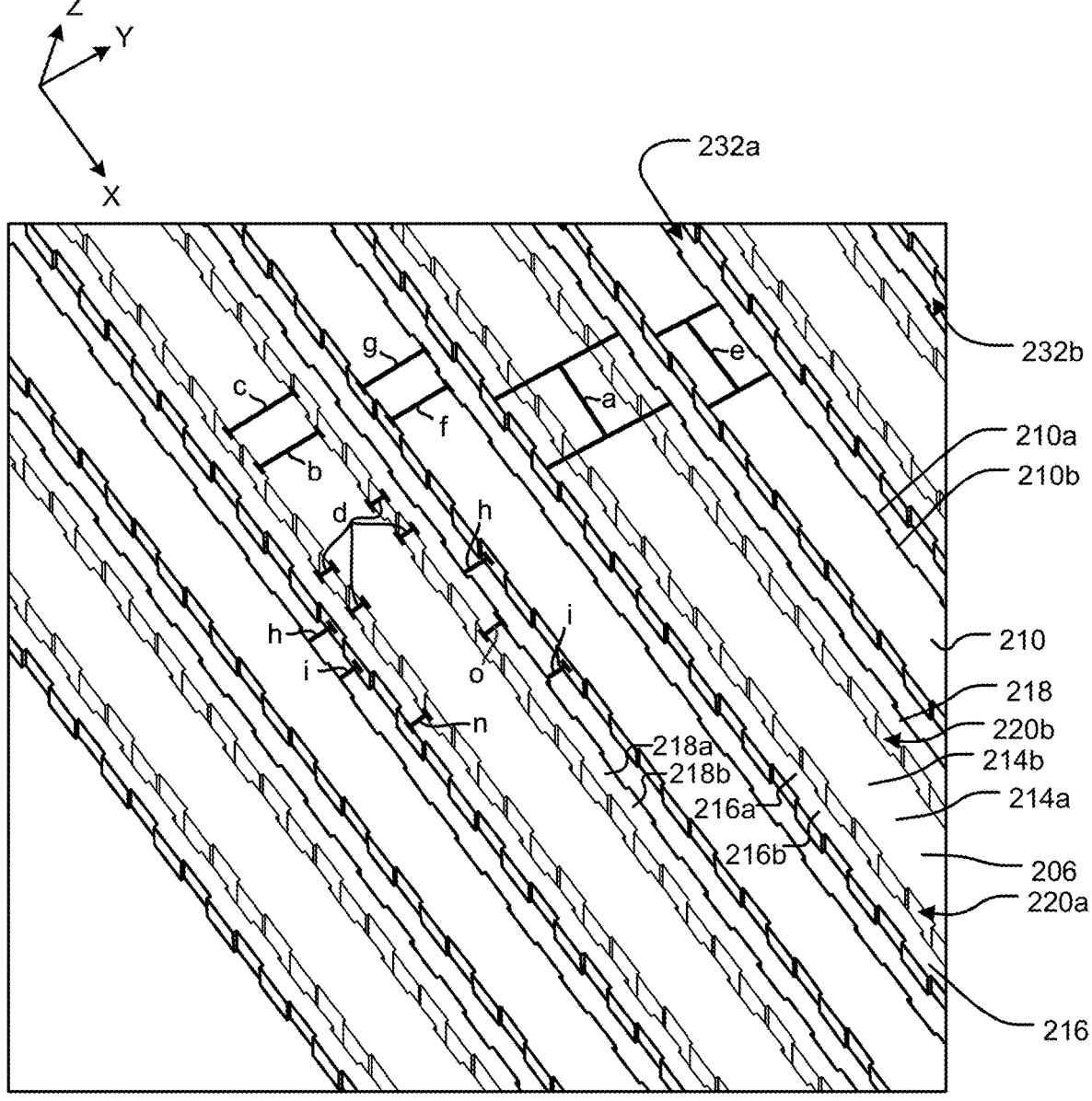

FIG. 6 is an enlarged top isometric view of a portion of an enlarged top plan view of a portion of the waveguide grating antenna array of FIG. 2 with the upper waveguide grating layer removed to isolate the lower waveguide layer below.

Figure 7:
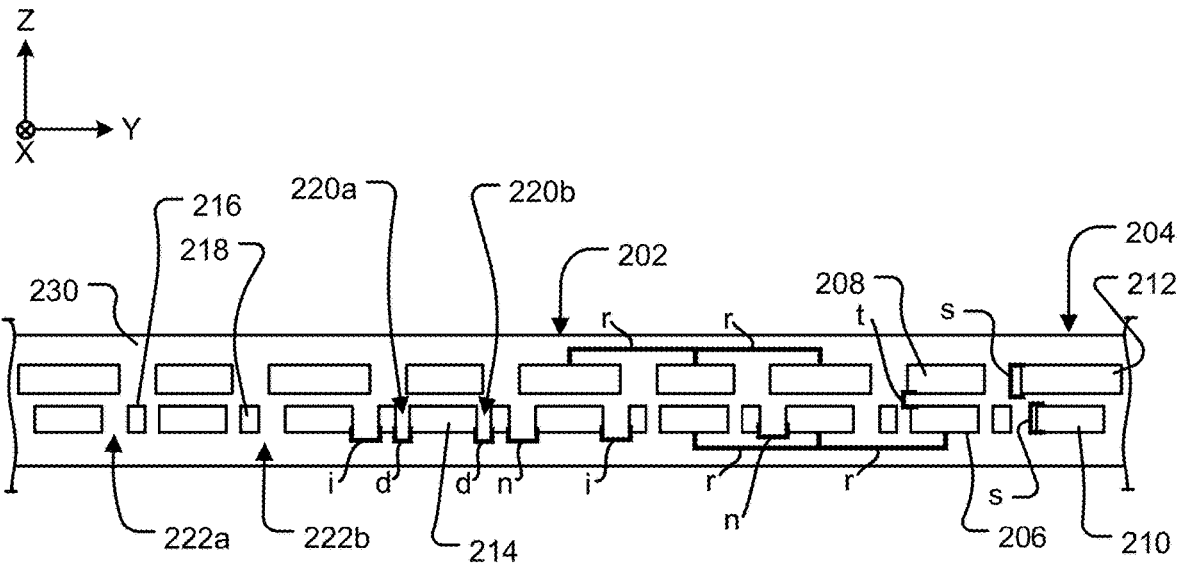

FIG. 7 is an enlarged front elevation view of a portion of the waveguide grating antenna array of FIG. 2.

Figure 8:
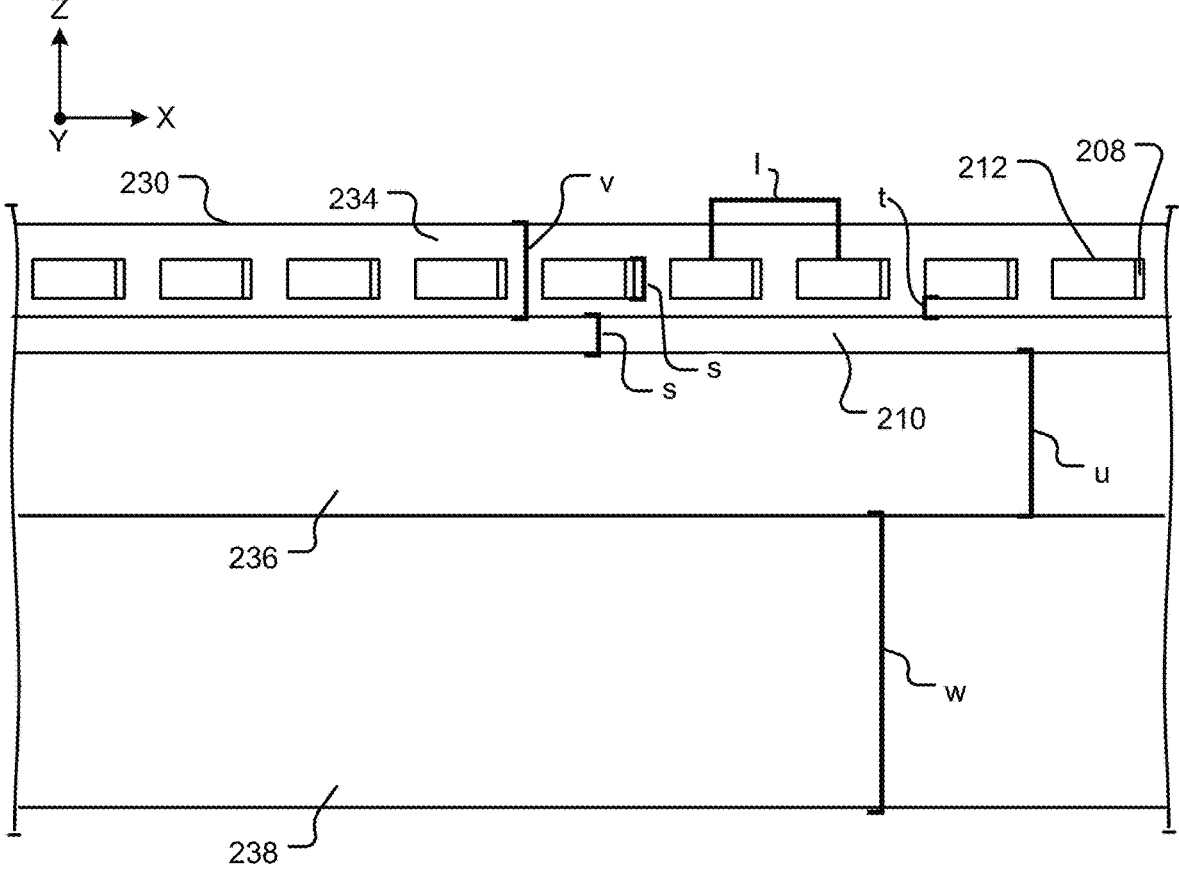

FIG. 8 is an enlarged left side elevation view of a portion of the waveguide grating antenna array of FIG. 2.

Figure 9:
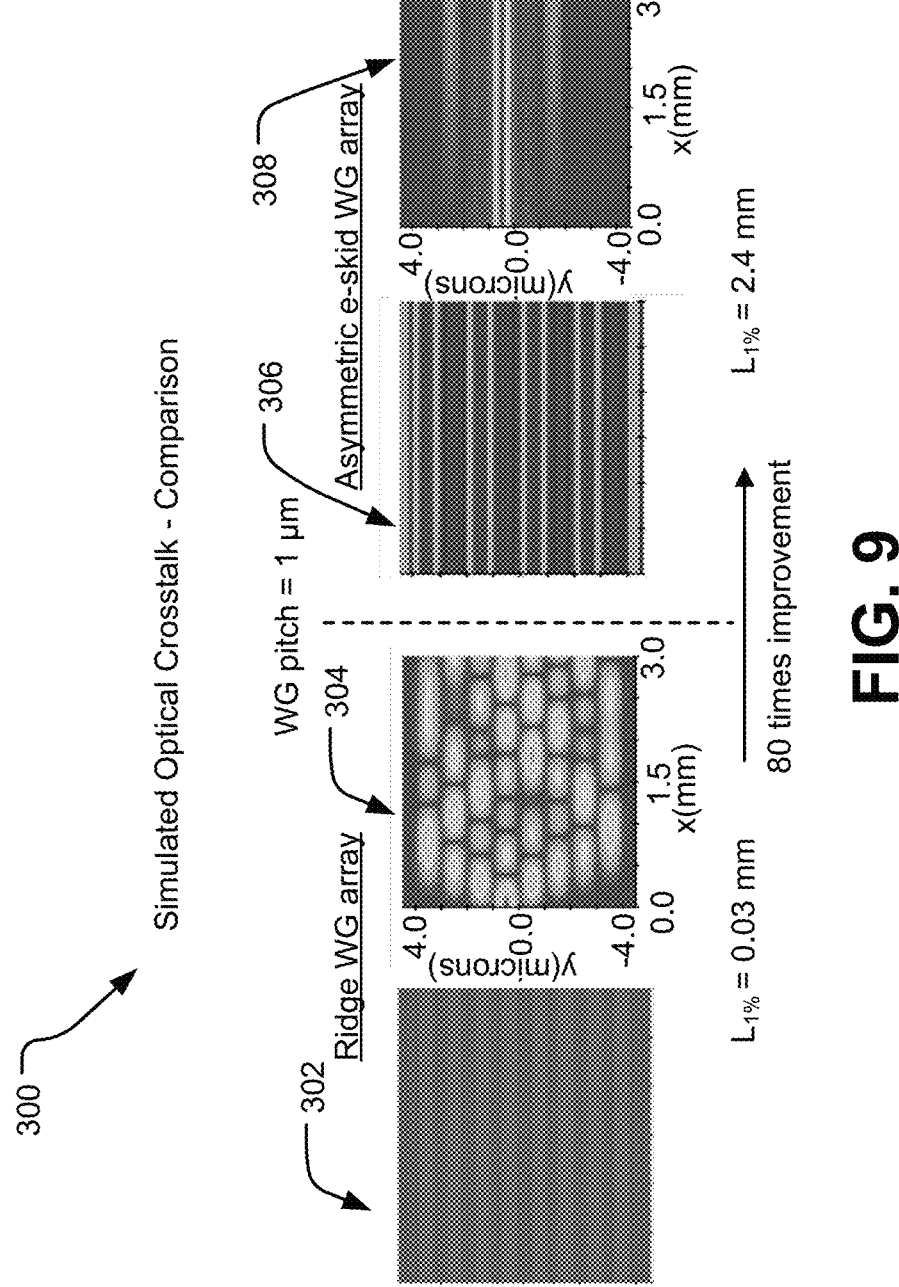

FIG. 9 is a collection of data graphs depicting optical crosstalk reduction of the waveguide grating antenna array disclosed herein compared to a known ridge waveguide array design.

DETAILED DESCRIPTION

Optical beam-steering to orient source light emissions at various angles is key to implementing free-space active optical imaging, for example, in light-detection-and-ranging (LiDAR) devices. For example, autonomous systems such as robotics and self-driving vehicles directly benefit from LiDAR devices for mapping the surrounding environment in three dimensions. Historically, LiDAR systems have included bulky optomechanical devices for beam steering purposes. More recently, non-mechanical optical-beam-steering of light emissions from an integrated solid-state chip-scale module have been developed. The reduced size and weight of these steerable emission modules allows for the development low-cost LiDAR systems. Optical beam steering by solid-state optical phased arrays (OPA) may also take advantage of well-established semiconductor manufacturing infrastructures.

An array of coherent light emitters, i.e., WGA arrays, with individual phase control may be used to define and control a near-field pattern, which also determines the far-field pattern based on Fraunhofer diffraction. The far-field output lateral beam angle is determined by the slope of the near-field phase, allowing the beams to be steered in the desired direction by controlling the phase of each emitter. Additionally, the use of grating material such as silicon nitride (SiN) provides for increased unidirectionality of light emissions (up to 80-90%) from WGA arrays; whereas a much higher percentage of light emissions were previously lost to the substrate. Greater unidirectional light emission results in increased range and intensity and thus greater intensity of reflected light for detection and ranging.

To achieve a single-lobe far-field pattern and high-resolution beam-steering, an OPA chip arranges a large number of waveguide antennas (thousands) in an array with sub-wavelength pitch dimensions. However, tightly packed antenna arrays often exhibit optical crosstalk between adjacent antennas, which diminishes the achievable resolution. Optical crosstalk between antennas is typically reduced by adjusting (limiting) the length of the waveguide antennas and limiting the lateral pitch between adjacent antennas. However, the optical beam divergence and horizontal field of view (FoV) are also respectively dependent upon device length and lateral pitch. Greater antenna length typically reduces optical beam divergence. A smaller lateral pitch typically increases the horizontal FoV. The need to minimize optical crosstalk is often at odds with competing desires to minimize beam divergence and maximize the horizontal field of view.

Semiconductor photonic integrated circuit (PIC) manufacturing processes available through the semiconductor industry and foundries may be harnessed to create such OPA chip modules with high integration density. Asymmetric ridge waveguide arrays and symmetric extreme skin-depth (e-skid) waveguide arrays are two of the published techniques to reduce optical crosstalk between closely packed waveguides. However, they each have limitations when used as WGA array designs. For asymmetric ridge waveguide arrays, different waveguide widths results in unbalanced emission between adjacent antennas and degraded far-field beam quality. E-skid waveguide arrays are typically formed with small feature sizes which are difficult to fabricate outside of a laboratory setting when following standard commercial foundry design rules.

The present disclosure combines the concepts of asymmetric ridge waveguides, symmetric extreme skin-depth (e-skid) waveguides, and Si/SiN dual-layer unidirectional WGA in a commercially manufacturable design that has low crosstalk, high directionality, and balanced emission between adjacent waveguide antennas of different design and dimension. An example, schematic representation of an OPA semiconductor PIC, i.e., a solid-state chip 100 for light output in a LiDAR device, is depicted in FIG. 1. The chip 100 may be formed from a wafer substrate 102 that supports or includes an optical waveguide 104, a multimode interferometer (MMI) tree beam-splitter 106, a thermo-optical phase shifter array 108, and a WGA array 110 that outputs unidirectional light beams 112 above the chip 100, primarily in the Z-axis direction. The optical waveguide 104 receives light from a single laser input and feeds it to a distribution network, i.e., the MMI tree beam-splitter 106, to ultimately distribute the laser light input evenly among each of the waveguide antenna in the WGA array 100. The phase shifter array 108 individually controls the optical-phase of each channel emanating from the MMI tree beam splitter 106 to determine the far-field pattern of emission. The WGA array 110 may be on the order of 2-3 mm in length along the X-axis and emits light 112 from the chip 100 into free space.

As indicated in FIG. 1, the light beams 112 emitted from each of the waveguide antennas in the WGA array 110 may be steered in the X-axis direction by a certain degree from vertical (±θ) and in the Y-axis direction by a certain degree from vertical (±φ). Lateral, or Y-direction (φ), beam steering is achieved by using the phase shifter array 108 to control the optical phase of light entering each waveguide antenna of the WGA array 110, thereby tilting the phase of the emission plane of the light beams 112. Longitudinal, or X-direction (θ), beam steering is achieved by varying the wavelength of the laser light injected into the into the optical waveguide 104. The wavelength is selected in consideration of the grating period of each antenna design in the WGA array 110 following the fundamental Bragg reflection law for the radiation direction to thereby achieve the desired angular offset.

An example implementation of a section of a WGA array 200 for use in the chip 100 of FIG. 1 for LiDAR device is depicted in various views in FIGS. 2-8. Notably, the figures only depict small sections or portions of the WGA array 200 as a typical WGA array for a LiDAR device would have between 1000-8000 waveguide antennas in the array. The axes accompanying each of FIGS. 2-8 indicate the longitudinal direction, i.e., the length of the WGA array 200, along the X-axis; the lateral direction, i.e., the width of the thousands of parallel waveguide antennas, along the Y-axis; and the vertical direction, the primary direction of light emission from the WGA array, along the Z-axis. FIG. 3 depicts a smaller portion of the WGA array 200 that is enlarged for ease of understanding. FIGS. 4 and 5 are top and bottom plan views of the WGA array 200, respectively. FIG. 6 is a top isometric view of the lower waveguide layer with the upper waveguide grating layer removed for increased clarity of the lower structure. FIGS. 7 and 8 are front and left side elevation views, respectively, of the WGA array 200. FIGS. 7 and 8 further depict an encapsulating material 230 surrounding the WGA array 200 as further described below. Further, it should be appreciated that FIGS. 2-8 are schematic and not to scale. In particular, some relative dimensions are enlarged to improve reproducibility and clarity.

With reference to FIGS. 2-8 generally, the example WGA array 200 is composed of two designs of WGAs arranged in parallel and alternating laterally in the Y-axis direction: a wide WGA 202 and a narrow WGA 204. The terms "wide" and "narrow" as used here are merely relative terms to distinguish between the two WGA designs and the terms are not meant to connote anything other than relative widths for identification in this discussion. Each wide WGA 202 is composed of a lower layer e-skid waveguide 206 and a corresponding upper waveguide layer of e-skid grating elements 208 centered above and along the length of the e-skid waveguide 206. The term "e-skid grating" as used herein is merely meant to refer to the portion of the upper waveguide layer array grating elements extending above and along each e-skid waveguide 206 for identification purposes. Each narrow WGA 204 is composed of a lower layer single ridge waveguide 210 and a corresponding upper waveguide layer of ridge grating elements 212 centered above and along the length of the ridge waveguide 210. Similarly, the term "ridge grating" as used herein is merely meant to refer to the portion of the array grating elements extending above and along each ridge waveguide 210 for identification purposes.

The lateral pitch (r) in the Y-axis direction between each adjacent parallel wide WGA 202 and narrow WGA 204 pair is constant across the entire WGA array 200. Each of the wide WGA 202 and the narrow WGA 204 has the same height in the Z-axis direction measured from the bottom surfaces of each of the e-skid waveguide 206 and the ridge waveguide 210 to the top surfaces of each of the e-skid grating elements 208 and the ridge grating elements 212, respectively. The thicknesses of the e-skid waveguide 206 and the ridge waveguide 210 are the same. Similarly, the thicknesses (in the Z-axis direction) of the e-skid grating elements 208 and the ridge grating elements 212 are the same. A constant separation distance (t) is maintained between the waveguide layer (the top surfaces of the e-skid waveguide 206 and the ridge waveguide 210) and the grating layer (the bottom surfaces of the e-skid grating elements 208 and the ridge grating elements 212).

The e-skid waveguide 206 and the ridge waveguide 210 in the lower waveguide layer are formed of silicon (Si). The e-skid grating elements 208 and the ridge grating elements 212 in the upper grating layer are formed of silicon nitride (SiN). The elements of the wide WGA 202 and the narrow WGA 204 are encapsulated in silicon dioxide (SiO$_2$), which forms an enclosure 230 about the WGA array 200. The SiO$_2$ forms a cap layer 234 of thickness (v) above the lower waveguide layer and a box layer 236 of thickness (u) below the lower waveguide layer. SiO$_2$ also fills the separation distance (t) between the lower waveguide layer and the upper waveguide grating layer of the WGA array 200. The enclosed WGA array 200 is formed upon a silicon substrate 238 of thickness (w). (See FIG. 8.) The use of silicon nitride for the gratings above the silicon waveguides induces a constructive interference for unidirectional upward (Z-axis) light emissions. The constructive interference arises from the two shifted waveguide layers (Si & SiN). The interference condition is controlled by the longitudinal shift distances in the x-axis between the upper (SiN) and lower (Si) grating layers, the vertical distance (t) between the upper and lower layers, light wavelength, and the refractive indices of the scattering centers. It is easier to realize symmetric and full interference with the same material in both of the waveguide layers (such as Si/Si or SiN/SiN). In the disclosed design, the Si/SiN waveguide layers have mismatched materials and thus different refractive indices, making it more difficult to achieve high unidirectionality (typically considered >75% light output in a direction). However, with systematic tuning of the geometry as described herein, high unidirectionality (~90%) of the disclosed design is still achieved in simulation results.

The e-skid waveguide 206 is further composed of a center ridge 214 similar in width to the ridge waveguide 210 and bounded on each lateral side (in the Y-axis direction) by narrow, lateral ridges 216, 218. The lateral ridges 2016, 218 are separated from the center ridge 214 by narrow air gaps 220a, 220b. The ridge waveguide 210 is similarly separated from each of the lateral ridges 216, 218 of separate laterally adjacent e-skid waveguides 206 by lateral channels 222a, 222b that are wider than the airgaps 220a, 220b. While the channels 222a, 222b are wide enough for the SiO$_2$ encapsulation to fill the space, the air gaps 220a, 220b are typically sufficiently narrow (~100 nm) that the SiO$_2$ does not fill the space and they are primarily longitudinal air pockets within the enclosure 230. The larger difference in refractive index between air and SiO$_2$ in the air gaps 220a, 220b causes a stronger asymmetric effect. The stronger asymmetry helps decrease the optical crosstalk between the adjacent wide WGA 202 and the narrow WGA 204. While the air gaps 220a, 220b may be filled with SiO$_2$ using some manufacturing techniques, it is preferable to maintain the air gaps 220a, 220b to reduce crosstalk.

Each of the ridge waveguide 210 and the center ridge 214 of the e-skid waveguide 206 has a non-uniform width along its length. The center ridge 214 consistently alternates between narrower sections 214a of a first width (b) and wider sections 214b of a second width (c) in the Y-axis direction creating a "corrugated" sidewall along each lateral side of the center ridge 214. The pitch between centers of each of the narrower sections 214a is indicated as a first length (a) in the X-axis direction. The pitch between centers of each of the wider sections 214b in the X-axis direction is thus similarly the first length (a) and the common length of each of the narrower sections 214a and the wider sections 214b in the X-axis direction is therefore a/2.

Similarly, the ridge waveguide 210 consistently alternates between narrower sections 210a of a third width (f) and wider sections 210b of a fourth width (g) in the Y-axis direction creating a "corrugated" sidewall along each lateral side of the ridge waveguide 210. The pitch between centers of each of the narrower sections 210a is indicated as a second length (e) in the X-axis direction. The pitch between centers of each of the wider sections 210b in the X-axis direction is thus similarly the second length (e) and the common length of each of the narrower sections 210a and the wider sections 210b in the X-axis direction is therefore e/2. The corrugated forms of the sidewalls of the e-skid waveguide 206 and the ridge waveguide 210 function to arrest some of the longitudinal (X-axis) propagation of the light and force an upward (Z-axis) emission of the light from the waveguide to increase upward unidirectionality of the waveguide layer.

In typical WGA arrays, the gratings cause light emissions from the diffraction effect of periodic scattering center perturbations. If the WGA is vertically symmetric, the light emitted up/down will be 50%/50% theoretically. In implementations of the design disclosed herein, a combination of Si & SiN waveguide layers and a small X-axis shift between the two waveguide layers induces a constructive interference upward (~90% upward/10% downward). The wide WGA 202 and the narrow WGA 204 are designed separately to realize this effect. Both the wide WGA 202 and the narrow WGA 204 have low optical crosstalk, allowing each wide WGA 202 and narrow WGA 204 to work independently without being affected by the adjacent ones.

Each of the airgaps 220a, 220b between the center ridge 214 and the lateral ridges 216, 218 is uniform in width (i.e., gap width (d)) in the Y-axis direction along its entire length in the X-axis direction. Similarly, both of the lateral ridges 216, 218 are uniform in width (i.e., widths (n) and (o)) in the Y-axis direction along their entire lengths in the X-axis direction. The lateral ridges 216, 218 undulate or have offset sections 216a, 216b, 218a, 218b that follow the widths of the adjacent narrow sections 214a or wider sections 214b in order to maintain a consistent width (d) within the air gaps 220a, 220b. The separation distance between the lateral ridges 216, 218 from the narrow sections 210a and wide sections 210b of the ridge waveguide in the channels 222a, 222b thus changes depending upon whether offset sections 216a/218a oppose a narrow section 210a or a wide section 210b and similarly whether offset sections 216b/218b oppose a narrow section 210a or a wide section 210b. The separation distance between the lateral ridges 216, 218 and the ridge waveguide 210 across the channels 222a, 222b can thus vary between a maximum separation distance (h) and a minimum separation distance (i) with two intermediate distances.

The e-skid grating elements 208 are uniform in size and pitch and are centered laterally on and extend above and along the length of each e-skid waveguide 206. The width of each e-skid grating element 208 in the Y-axis direction is indicated by a fifth width (k), which is wider than both the narrow sections 214a and wider sections 214b of the center ridge 214. The fifth width (k) does not extend over either of the narrow lateral ridges 216, 218 and thus its lateral ends are positioned over the air gaps 220a, 220b. The pitch between centers of each element of the e-skid grating 208 in the X-axis direction is a third length (j). The distance between each e-skid grating element 208 in the X-axis direction is the same as the length of each e-skid grating element 208 in the X-axis direction. Therefore, both the length of each e-skid grating element 208 and the separation distance between adjacent e-skid grating elements is j/2.

Similarly, the ridge grating elements 212 are uniform in size and pitch and are centered on and extend above and along the length of each ridge waveguide 210. The width of each ridge grating element in the Y-axis direction is indicated by a sixth width (m), which is wider than both the narrow sections 210a and wider sections 210b of the ridge waveguide 210. The lateral ends of the ridge grating elements 212 are thus positioned over the channels 222a, 222b. The pitch between centers of each element of the ridge grating 212 in the X-axis direction is a fourth length (l). The distance between each ridge grating element 212 in the X-axis direction is the same as the length of each ridge grating element 212 in the X-axis direction. Therefore, both the length of each ridge grating element 212 and the separation distance between adjacent ridge grating elements is l/2.

In example embodiments, the e-skid grating elements 208 may be positioned above the e-skid waveguide 206, straddling corresponding adjacent narrow section 214a and wider section 214b pairs of the center ridge 214. The e-skid grating elements 208 may be offset in the Y-axis direction from an interface between a narrow section 214a and wider section 214b pair by a first offset distance (p). Similarly, the ridge grating elements 212 may be positioned above the ridge waveguide 210, straddling corresponding adjacent narrow section 210a and wide section 210b pairs of the ridge waveguide 210. The ridge grating elements 212 may be offset in the Y-axis direction from an interface between a narrow section 210a and wider section 210b pair by a second offset distance (q).

An example implementation of a WGA array 200 of the disclosed design is presented in Table A below providing example values for the various dimensions indicated in FIGS. 4-8. All measurements are in micrometers unless otherwise noted. The parameter values a-u presented in Table A should be understood to include a range of error ±0.005 μm (±5 nm) and still achieve comparable device performance.

TABLE A

| Parameters (μm) | Wide Waveguide Si Layer (narrow-gap side ridges) | Narrow Waveguide Si Layer (wide-gap) | Narrow Grating SiN Layer (narrow-gap side ridges) | Wide Grating SiN Layer (wide-gap) |
| --- | --- | --- | --- | --- |
| Pitch_x | a = 0.720 | e = 0.715 | j = 0.720 | l = 0.715 |
| Width_y | b = 0.50 | f = 0.50 | k = 0.63 | m = 0.80 |
|  | c = 0.555 | g = 0.54 |  |  |
| Narrow Ridge Width-y | n = 0.15 o = 0.25 | NA |  | NA |
| Gap_w/_e-skid | d = 0.10 | h = 0.25 i = 0.2025 |  | N/A |
| Apodization |  | N/A |  |  |
| Shift_x |  | N/A | p = 0.13 | q = 0.13 |
| Array Length |  | 2000-3000 (2.0-3.0 mm) |  |  |
| Pitch_y |  | r = 1.0 |  |  |
| Height |  | s = 0.22 |  |  |
| Gap b/w Si & SiN Layers |  | t = 0.1 |  |  |
| SiO₂ BOX Layer Thickness |  | u = 2 |  |  |

TABLE A-continued

| Parameters (μm) | Wide Wave-guide Si Layer (narrow-gap side ridges) | Narrow Wave-guide Si Layer (wide-gap) | Narrow Grating SiN Layer (narrow-gap side ridges) | Wide Grating SiN Layer (wide-gap) |
|---|---|---|---|---|
| SiO₂ Cap Thickness | | v = >1 (arbitrary) | | |
| Si Substrate Thickness | | w = ~500 (arbitrary) | | |

In the embodiment of Table A, it is notable that the lateral pitch (r) in the Y-axis direction between centers of adjacent wide WGA 202 and narrow WGA 204 is 1.0 μm, which is smaller than the lateral pitch of current commercial or foundry-produced WGA arrays, which is typically on the order of 1.4 μm. However, the design of the WGA array 200 disclosed herein is capable of being commercially produced with present foundry equipment. While other WGA designs based on the traditional ridge waveguide arrays have also achieved 1 μm pitch, those designs suffer from very significant optical crosstalk. (See FIG. 9 and related discussion below.) Optical crosstalk in waveguide arrays is a fundamental limitation of a combination of the lateral pitch and longitudinal length of the waveguides. By reducing the lateral pitch, more waveguide antennas can be packed on a chip. As the number of WGAs increases, the emitted beam becomes more focused, resulting in better focus, and intensity increases, resulting in greater range. In simulations using the embodiment of Table A, a beam divergence (δθ) as low as approximately 0.045° and intensity loss as low as approximately 0.4 dB at 1550 nm were achieved.

As noted previously, the field of view of the WGA array increases as the pitch between the WGA elements of the array narrows. In the embodiment of Table A, a field of view of approximately 100° may be achieved. The greater the field of view, the fewer WGA arrays are needed for a LiDAR device. For example, with the embodiment of Table A, two WGA arrays with 100° field of view could achieve over a 180° field of view whereas three WGA arrays with 60° fields of view would be required to achieve the same coverage. Reduction in the number of WGA arrays in a LiDAR device could result in cost savings, as well as smaller devices as fewer additional components (e.g., laser input sources) are needed.

Another aspect of note in the WGA array 200 design of Table A is that the values of longitudinal pitch (a) and (j) of the wide WGA 202 are slightly larger than the values of longitudinal pitch (e) and (l) of the narrow WGA 204 resulting in an offset pitch between the two. While barely visually noticeable in the enlarged sections of the WGA array 200 presented in FIGS. 3-8, the result is that lateral alignment in the Y-axis direction between the narrow section 214a, wide section 214b, and e-skid grating elements 208 of each wide WGA 202 and narrow section 210a, wide section 210b, and ridge grating elements 212 of each narrow WGA 202 will shift longitudinally along the X-axis direction of the WGA array 200 resulting in variable longitudinal asymmetry across the entire WGA array 200. The longitudinal asymmetry is a part of the geometry design to realize balanced emission angles and upward directionality between the two kinds of WGA structures, i.e., the wide WGA 202 and the narrow WGA 204. The emission angles and directionality are determined by the combination of the structural parameters.

The widths, heights, and separations of the main waveguides can be set to balance the emission properties of the wide (e-skid) WGA 202 and narrow (ridge) WGA 204. The goal is for each antenna to provide similar performance output. In the example embodiment of Table A, both the wide (e-skid) WGA 202 and narrow (ridge) WGA 204 exhibit between 94% and 96% upward (Z-axis) directionality between 1475 nm and 1600 nm. Angular dispersion, upward transmission, and forward transmission are also highly correlated (within 2-4%), if not almost identical, for both antennas over the same range of wavelengths. Similarly, beam steering overlap is highly correlated over the same wide range of wavelength inputs.

FIG. 9 presents a comparison 300 of optical crosstalk efficiency between a typical, symmetrical ridge WGA array 302 and an implementation of an asymmetric e-skid WGA array 306 as disclosed herein. The crosstalk pattern 304 of the symmetrical ridge WGA array 302 from the waveguide antenna centered at about 0.5 μm is widespread among adjacent waveguides for at least 4 μm in each lateral direction. In addition, measurement of 1% light leakage (L1%) occurred within 0.03 mm of the length of the symmetrical ridge WGA array 302 (modeled to extend longitudinally for 3 mm). Typically, the length of a WGA array needs to be longer. To have a design of 2-3 mm L in the prior art WGA array 302, the pitch would need to be 1.4 μm or wider. In contrast, the crosstalk pattern 308 of the asymmetric e-skid WGA array 306 from the e-skid waveguide antenna centered at about 0.5 μm is significantly confined to under 1 μm in width, i.e., there is little optical power transfer with adjacent waveguide antenna. The limited crosstalk extends the entire length of the asymmetric e-skid WGA array 306, i.e., up to 3 mm. Further, the measurement of 1% light leakage (L1%) occurred at about 2.4 mm of the 3 mm length of the asymmetric e-skid WGA array 306. This represents an improvement of 80 times over the performance of the symmetrical ridge WGA array 302 at the same 1 μm pitch. Thus, due to the low optical crosstalk, implementations of the asymmetric e-skid WGA array 306 can achieve a small pitch (~1 μm) and a long device length (L=2-3 mm) with minimal leakage at the same time.

In an example implementation, a waveguide grating antenna apparatus includes a substrate layer, a lower waveguide array layer upon the substrate, and an upper waveguide array layer positioned above the lower waveguide array layer. The lower waveguide array layer is composed of a plurality of first waveguides extending axially and a plurality of second waveguides extending axially and arranged in parallel and alternating in position with the plurality of first waveguides across the lower waveguide array layer. Each first waveguide is of a first maximum width. Each second waveguide is of a second maximum width narrower than the first maximum width and is spaced apart from each adjacent first waveguide. The upper waveguide array layer is composed of adjacent, separated elements extending axially along each first waveguide and each second waveguide.

In an example of a related implementation, the upper waveguide array layer is asymmetric in form such that a first set of the separated elements of the upper waveguide array layer extending axially along each of the first waveguides is different in width in a direction transverse to the axial direction from a second set of separated elements extending axially along each of the second waveguides.

In an example of a related implementation, a first width of each of the first set of the separated elements is smaller than a second width of the second set of the separated elements.

In an example of a related implementation, a first axial pitch between adjacent pairs of the first set of elements is different than a second axial pitch between adjacent pairs of the second set of elements.

In an example of a related implementation, a first axial pitch between adjacent pairs of the first set of elements is larger than a second axial pitch between adjacent pairs of the second set of elements.

In an example of a related implementation, wherein an axial separation distance between adjacent elements of the first set of the separated elements is constant.

In an example of a related implementation, wherein an axial separation distance between adjacent elements of the second set of the separated elements is constant.

In an example of a related implementation, a first axial separation distance between adjacent elements of the first set of the separated elements is constant; a second axial separation distance between adjacent elements of the second set of separated elements is constant; and the first axial separation distance is larger than the second separation distance.

In an example of a related implementation, a lateral pitch between an axial center of each first waveguide and an axial center of each adjacent second waveguide is constant between each adjacent pair of first waveguides and second waveguides.

In an example of a related implementation, a lateral pitch between an axial center of each first waveguide and an axial center of each adjacent second waveguide is less than 1.1 μm, and preferably 1.0 μm.

In an example of a related implementation, each first waveguide is composed of a center ridge and two lateral ridges extending along and spaced apart from each side of the center ridge such that gaps are formed between the center ridge and each lateral ridge.

In an example of a related implementation, wherein each first waveguide is spaced apart from each adjacent second waveguide a separation distance greater than a width of the gaps.

In an example of a related implementation, the upper waveguide array layer is asymmetric in form such that a first set of the separated elements of the upper waveguide array layer extending axially along each of the first waveguides is different in width from a second set of separated elements extending axially along each of the second waveguides; and each of the first set of elements has a first width that is greater than a second width of the center ridge and is less than a measure of a sum of the second width, a third width of a first of the gaps, and a fourth width of a second of the gaps.

In an example of a related implementation, the upper waveguide array layer is asymmetric in form such that a first set of the separated elements of the upper waveguide array layer extending axially along each of the first waveguides is different in width from a second set of separated elements extending axially along each of the second waveguides; and each of the second set of elements has a first width that is greater than a second width of the second waveguide.

In an example of a related implementation, each sidewall of the center ridge is corrugated; each sidewall of each lateral ridge is corrugated in an identical pattern and size as the corrugation of the center ridge and is aligned with the center ridge such that a width of the gaps formed between the center ridge and each lateral ridge is constant along an axial length of each first waveguide.

In an example of a related implementation, each sidewall of each second waveguide is corrugated; each second waveguide is longitudinally offset from each adjacent first waveguide such that a pattern and a size of the corrugation of the second waveguide is misaligned with the corrugation of adjacent lateral ridges such that a width of a channel between each first waveguide and each second waveguide varies along an axial length of the first waveguides and the second waveguides.

In an example of a related implementation, each sidewall of the center ridge is corrugated such that the center ridge alternates in width axially in sections between a first width and the second width that is larger than the first width.

In an example of a related implementation, each sidewall of each second waveguide is corrugated such that the second waveguide alternates in width axially in sections between a minimum width and the second maximum width that is larger than the minimum width.

In an example of a related implementation, each first waveguide and each second waveguide are formed in alternating sections of varying widths along an axial length of each waveguide.

In an example of a related implementation, the substrate layer is composed of silicon dioxide; the lower waveguide array layer is composed of silicon; and the upper waveguide array layer is composed of silicon nitride.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The example drawings are for purposes of illustration only and the dimensions, positions, order and relative sizes reflected in the drawings attached hereto may vary.

The above specification, examples and data provide a complete description of the structure and use of example embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:
1. A waveguide grating antenna apparatus comprising
a substrate layer;
a lower waveguide array layer upon the substrate composed of a plurality of first waveguides extending axially and a plurality of second waveguides extending axially and arranged in parallel and alternating in position with the plurality of first waveguides across the lower waveguide array layer in which each first waveguide is of a first maximum width; and each second waveguide is of a second maximum width narrower than the first maximum width and is spaced apart from each adjacent first waveguide; and an upper waveguide array layer positioned above the lower waveguide array layer composed of adjacent, separated elements extending axially along each first waveguide and each second waveguide, wherein each first waveguide is composed of a center ridge and two lateral ridges extending along and spaced apart from each side of the center ridge such that gaps are formed between the center ridge and each lateral ridge.

2. The apparatus of claim 1, wherein the upper waveguide array layer is asymmetric in form such that a first set of the separated elements of the upper waveguide array layer extending axially along each of the first waveguides is different in width in a direction transverse to the axial direction from a second set of separated elements extending axially along each of the second waveguides.

3. The apparatus of claim 2, wherein a first width of each of the first set of the separated elements is smaller than a second width of the second set of the separated elements.

4. The apparatus of claim 2, wherein a first axial pitch between adjacent pairs of the first set of elements is different than a second axial pitch between adjacent pairs of the second set of elements.

5. The apparatus of claim 2, wherein a first axial pitch between adjacent pairs of the first set of elements is larger than a second axial pitch between adjacent pairs of the second set of elements.

6. The apparatus of claim 2, wherein an axial separation distance between adjacent elements of the first set of the separated elements is constant.

7. The apparatus of claim 2, wherein an axial separation distance between adjacent elements of the second set of the separated elements is constant.

8. The apparatus of claim 2, wherein a first axial separation distance between adjacent elements of the first set of the separated elements is constant;

a second axial separation distance between adjacent elements of the second set of separated elements is constant; and the first axial separation distance is larger than the second separation distance.

9. The apparatus of claim 1, wherein a lateral pitch between an axial center of each first waveguide and an axial center of each adjacent second waveguide is constant between each adjacent pair of first waveguides and second waveguides.

10. The apparatus of claim 1, wherein a lateral pitch between an axial center of each first waveguide and an axial center of each adjacent second waveguide is less than 1.1 μm.

11. The apparatus of claim 1, wherein each first waveguide is spaced apart from each adjacent second waveguide a separation distance greater than a width of the gaps.

12. The apparatus of claim 1, wherein the upper waveguide array layer is asymmetric in form such that a first set of the separated elements of the upper waveguide array layer extending axially along each of the first waveguides is different in width from a second set of separated elements extending axially along each of the second waveguides; and each of the first set of elements has a first width that is greater than a second width of the center ridge and is less than a measure of a sum of the second width, a third width of a first of the gaps, and a fourth width of a second of the gaps.

13. The apparatus of claim 1, wherein the upper waveguide array layer is asymmetric in form such that a first set of the separated elements of the upper waveguide array layer extending axially along each of the first waveguides is different in width from a second set of separated elements extending axially along each of the second waveguides; and each of the second set of elements has a first width that is greater than a second width of the second waveguide.

14. The apparatus of claim 1, wherein each sidewall of the center ridge is corrugated;

each sidewall of each lateral ridge is corrugated in an identical pattern and size as the corrugation of the center ridge and is aligned with the center ridge such that a width of the gaps formed between the center ridge and each lateral ridge is constant along an axial length of each first waveguide.

15. The apparatus of claim 14, wherein each sidewall of each second waveguide is corrugated;

each second waveguide is longitudinally offset from each adjacent first waveguide such that a pattern and a size of the corrugation of the second waveguide is misaligned with the corrugation of adjacent lateral ridges such that a width of a channel between each first waveguide and each second waveguide varies along an axial length of the first waveguides and the second waveguides.

16. The apparatus of claim 1, wherein each sidewall of the center ridge is corrugated such that the center ridge alternates in width axially in sections between a first width and the second width that is larger than the first width.

17. The apparatus of claim 1, wherein each sidewall of each second waveguide is corrugated such that the second waveguide alternates in width axially in sections between a minimum width and the second maximum width that is larger than the minimum width.

18. The apparatus of claim 1, wherein each first waveguide and each second waveguide are formed in alternating sections of varying widths along an axial length of each waveguide.

19. The apparatus of claim 1, wherein the substrate layer is composed of silicon dioxide;

the lower waveguide array layer is composed of silicon; and the upper waveguide array layer is composed of silicon nitride.

* * * * *